United States Patent
Bordoni et al.

(10) Patent No.: US 11,053,852 B2
(45) Date of Patent: Jul. 6, 2021

(54) TURBOJET ENGINE WITH THRUST TAKE-UP MEANS ON THE INTER-COMPRESSORS CASE

(71) Applicant: SAFRAN AIRCRAFT ENGINES, Paris (FR)

(72) Inventors: Nils Edouard Romain Bordoni, Moissy-Cramayel (FR); Michel Gilbert Roland Brault, Moissy-Cramayel (FR); Romain Guillaume Cuvillier, Moissy-Cramayel (FR); Guillaume Patrice Kubiak, Moissy-Cramayel (FR); Arnaud Nicolas Negri, Moissy-Cramayel (FR); Nathalie Nowakowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 314 days.

(21) Appl. No.: 16/063,929

(22) PCT Filed: Dec. 12, 2016

(86) PCT No.: PCT/FR2016/053332
§ 371 (c)(1),
(2) Date: Jun. 19, 2018

(87) PCT Pub. No.: WO2017/109328
PCT Pub. Date: Jun. 29, 2017

(65) Prior Publication Data
US 2018/0372001 A1    Dec. 27, 2018

(30) Foreign Application Priority Data
Dec. 24, 2015    (FR) ...................................... 1563322

(51) Int. Cl.
*F02C 7/20*    (2006.01)
*F01D 25/16*    (2006.01)
(Continued)

(52) U.S. Cl.
CPC .............. *F02C 7/20* (2013.01); *F01D 25/162* (2013.01); *F01D 25/24* (2013.01); *F01D 25/28* (2013.01);
(Continued)

(58) Field of Classification Search
CPC . F02C 7/20; F01D 25/24; F01D 25/28; F01D 9/00; F01D 9/04; F04D 29/522; F04D 29/541
See application file for complete search history.

(56) References Cited

U.S. PATENT DOCUMENTS

| | | | | |
|---|---|---|---|---|
| 2,770,946 A | * | 11/1956 | Savin | F01D 21/006 60/786 |
| 5,605,438 A | * | 2/1997 | Burdgick | F01D 25/145 415/182.1 |
| 2005/0198941 A1 | * | 9/2005 | Bart | F04D 29/059 60/226.1 |
| 2009/0255271 A1 | | 10/2009 | Vauchel et al. | |

(Continued)

FOREIGN PATENT DOCUMENTS

| CA | 2929947 A1 | 5/2015 |
|---|---|---|
| EP | 2610462 A2 | 7/2013 |

(Continued)

OTHER PUBLICATIONS

International Search Report dated Mar. 20, 2017, issued in corresponding International Application No. PCT/FR2016/053332, filed Dec. 12, 2016, 3 pages.

(Continued)

*Primary Examiner* — J. Todd Newton
*Assistant Examiner* — Cameron A Corday
(74) *Attorney, Agent, or Firm* — Christensen O'Connor Johnson Kindness PLLC (57) ABSTRACT

A multi-flow turbojet engine generally includes an upstream ducted fan driven by a gas generator, the gas generator (Continued)

having a first and a second compressor, which are coaxial, an inlet case forming a support for the rotors of the upstream ducted fan and of the first compressor, an inter-compressor case downstream of the inlet casing and forming a support for the rotors of the second compressor, attachment means for thrust take-up rods, which attachment means are arranged on the inter-compressor case. The turbojet engine includes at least one axial stress transmission rod for connecting the inlet case to the inter-compressor case.

12 Claims, 6 Drawing Sheets

(51) Int. Cl.
   *F01D 25/24* (2006.01)
   *F01D 25/28* (2006.01)
   *F02K 3/06* (2006.01)

(52) U.S. Cl.
   CPC ............ *F02K 3/06* (2013.01); *F05D 2240/90* (2013.01); *F05D 2250/241* (2013.01); *Y02T 50/60* (2013.01)

(56) References Cited

U.S. PATENT DOCUMENTS

| | | | |
|---|---|---|---|
| 2011/0064343 A1* | 3/2011 | Larrochelle | F16C 35/02 384/206 |
| 2016/0010482 A1* | 1/2016 | Rogers | F01D 25/246 415/173.1 |
| 2016/0138476 A1 | 5/2016 | Lemarchand et al. | |
| 2016/0298548 A1 | 10/2016 | Brault et al. | |

FOREIGN PATENT DOCUMENTS

| | | |
|---|---|---|
| FR | 3007458 A1 | 12/2014 |
| WO | 2008/000924 A1 | 1/2008 |

OTHER PUBLICATIONS

Written Opinion of the International Searching Authority dated Mar. 20, 2017, issued in corresponding International Application No. PCT/FR2016/05332, filed Dec. 12, 2016, 5 pages.

English Translation of Written Opinion of the International Searching Authority in corresponding International Application No. PCT/FR2016/053332, filed Dec. 12, 2019, 6 pages.

* cited by examiner

TURBOJET ENGINE WITH THRUST TAKE-UP MEANS ON THE INTER-COMPRESSORS CASE

FIELD OF THE INVENTION

The invention relates to the field of propulsion in aeronautics. It relates to the suspension of a turbojet engine to an aircraft, and more particularly to the arrangement of the transmission means or thrust take-up means provided by the engine to the structure of the aircraft.

STATE OF THE ART

The state of the art includes, in particular, documents CA-A1-2 929 947, EP-A2-2 610 462, WO-A2-2008/000924 and FR-A1-3 007 458.

A multi-flow turbo engine according to an architecture of the prior art includes, from upstream to downstream in the direction of the air flow through the turbojet engine, a ducted fan and a gas generator by means of which it is rotationally driven. The latter is formed by at least a compressor, an annular combustion chamber, at least a turbine and a combustion gas exhaust pipe. The air compressed by the ducted fan is divided into two concentric flows: a primary central flow that supplies the gas generator, and a secondary flow circulating around the generator. Both flows can be evacuated into the atmosphere separately by concentric exhaust pipes, or be mixed together downstream from the gas generator and evacuated into the atmosphere through a shared exhaust nozzle.

The gas generator is a multi-body gas turbine engine, featuring two bodies for example, with two coaxial and independent rotors. A first low pressure body includes a compressor and a turbine, connected by a first shaft; a second high pressure body includes a compressor and a turbine, connected by a second shaft that is coaxial to the first. The combustion chamber is supplied in compressed air successively by the ducted fan, the low pressure (LP) compressor and the high pressure (HP) compressor. The combustion gases are expanded successively in the HP high pressure turbine, and then in the LP low pressure turbine, before being evacuated into the atmosphere by the downstream exhaust pipe. The turbines driven by the combustion gases rotationally drive the respective compressors and the ducted fan, the shaft of which is connected to the LP low pressure turbine. The ducted fan can be driven directly by the shaft of the LP body, but according to engine evolutions, it is driven by means of a reducing gear when high bypass rates are required, i.e. an elevated ratio of the secondary flow to the primary air flow. In traditional turbojet engines, where the turbine is directly connected to the ducted fan, bypass rates are limited, namely, by the peripheral speed of the forward blades of the ducted fan. Architectures that feature a ducted fan driven by means of a reducing gear with an ultra-high bypass ratio (UHBR) are able to partially solve this problem by optimising the efficiency of the turbine at moderate ducted fan speeds.

In addition to the rotors, the engine features stator members for support, flow guiding and stress transmission purposes.

In double-flow turbojet engines, a large part of the thrust is provided by the secondary flow. The traction force exerted by the ambient air on the engine partially applies to the blades of the ducted fan, and partially to the walls of the pipe. The path of the stresses from the ducted fan is as follows: axial stresses applied to the blades of the ducted fan are transmitted by a thrust bearing to the fixed parts of the engine, and then to the engine suspensions, in particular the two thrust take-up rods. These rods are usually located in the zone between flow paths, and the attachment covers of the rods are angularly positioned at an angle of approximately 45° with respect to the vertical plane. This essentially provides the means to take-up the axial thrust stress generated by the ducted fan.

In this architecture, stresses go through the intermediate or inter-compressor case before being transmitted to the suspension.

On an engine with a reduction gear between the turbine shaft and the ducted fan shaft, with ultra-high bypass ratios mentioned above, the path of the stresses is arranged differently.

In this type of architecture, the engine includes, in addition to the inter-compressor case, an inlet case located between the ducted fan and the BP compressor so as to support the weight of the reduction gear and the bearings. The inlet case is therefore designed to support directly the reduction gear that features, for example, epicyclic gearing. The consequence of the presence of an inlet case is that the ducted fan and the LP shaft are no longer carried by the inter-compressor case, but by the inlet case. Therefore, the inlet case also takes up the axial stresses of the ducted fan shaft, through the bearing that supports the ducted fan shaft, as well as the axial stresses of the LP shaft, through the bearing of the LP shaft It should be noted that both bearings are selected so as to form axial bearings and absorb the axial loads. Ball bearings are used for this purpose, but other types of bearings are suitable too. For example, the rotor of the ducted fan can be supported by a double tapered roller bearing that can replace the currently used roller bearing and ball bearing.

The thrust take-up rods are preferentially secured to the inter-compressor case, as their assembly onto the inlet case would not be advantageous. In the latter case, the space in the zone between the flow paths would have to be extended to allow their inclusion. The length of the rods would have to be increased, which would have an impact on their weight. Furthermore, the stiffness of the rods would have to be increased to prevent vibrational stresses. Finally, their inclusion in the inlet case area would conflict with the installation of accessories, such as the oil tank, drain valve and the synchronising ring of the variable-pitch fin control of the compressor.

In this architecture, the axial stresses go through the inlet case and travel to the inter-compressor case through the LP compressor located between the two cases. This is not without consequence: the LP compressor case features low mechanical strength and the axial stress that corresponds to the thrust take-up on the case could cause deformations, the consequence of which would be, on one hand, increased clearance of the front blades causing a loss of efficiency, or on the other hand, reduced clearance of the front blades, creating the risk of stator/rotor contact.

The low mechanical strength of the LP compressor can be compensated by increasing its thickness, using the same material, which would result in increased weight. However, as long as stresses at transmitted through it, deformations can be observed with the above consequences.

The purpose of the present invention is to remedy this disadvantage.

PRESENTATION OF THE INVENTION

This objective can be achieved with a multi-flow turbojet that includes:
a. an upstream ducted fan driven by a gas generator,
b. whereby the gas generator includes a first and a second coaxial compressor,
c. an inlet case forming a support for the rotors of the ducted fan and the first compressor,
d. an inter-compressor case located downstream from the inlet case, and forming a support of the rotor of the second compressor,
e. attachment means for the thrust take-up rods arranged on the inter-compressor case.

According to the invention, the turbojet engine is characterised in that it includes at least one connecting rod transmitting the axial stress and connecting the inlet case to the inter-compressor case.

The solution according to the invention is therefore to create a second path for the stresses, which is more rigid than the compressor through which the axial stresses travel. This system removes the need to reinforce the compressor case, while not being penalised by added weight.

In one embodiment, the cases are connected by at least one pair of axial stress transmission rods, non-parallel to one another, and configured in a V-shape for example. Advantageously, at least one of the attachment means between the case and the rod features a ball-type connection. Therefore, only tensile/compression stresses can transit through the rod.

Also preferentially, the connection includes at least three pairs distributed about the axis of the engine.

This arrangement in V-shaped pairs is configured, with at least three pairs distributed around the circumference, to take-up all the stress that transits between the cases. These stresses include:
  axial stresses that correspond to the thrust take-up,
  shear stresses caused by the weight of the engine or the inertial stresses of the HP body suspended at its ends,
  the torsion torque on the engine axis,
  the bending torque resulting from the weight or the inertial stress of the HP body suspended at its ends.

The take-up of stresses, other than axial stresses, improve the mechanical situation of the engine, by limiting, for example, the deformation of the HP body.

This solution therefore allows transmitting of all types of stresses, while limiting the space used by the device and providing sufficient space for the accessories located above the LP compressor.

In one embodiment, at least one of the two cases features radial walls arranged perpendicularly to the axis, whereby both walls are interconnected by ribs oriented substantially in the direction of the axis. Advantageously in this case, at least one of the attachments of the rod to the case is located in the extension of one of the ribs. This ensures a good distribution of the stresses, with a connection between the ribs and the wall that forms stress distribution fillets. A fillet is a substantially round connection between two surfaces.

In one specific embodiment that further improves the distribution of stresses on the cases, at least one of the rods is located in the extension of a rib. Preferentially, two rods of a pair of axial stress transmission rods are located in the extension of a rib.

According to one embodiment version, the turbojet engine includes at least one pair of axial stress transmission rods and, the inter-compressor case featuring an upstream wall and a downstream wall, the rods of the pair are attached to the downstream wall.

The invention in particular relates to a turbojet engine featuring a ducted fan that is driven by a LP turbine and that includes a reduction gear between a shaft of the LP turbine and the ducted fan. The reduction gear, for example, features epicyclic gearing. The inlet case is arranged so as to form a support for the reduction gear. Preferentially, at least a part of the bearings supporting the shaft of the ducted fan and the LP shaft, respectively, in the inlet case, are configured to form axial bearings.

In one embodiment, the compressor case is configured to be floating. The case is configured to be floating by connecting it to one of the two inlet and inter-compressor cases with a backlash connection, preferentially with a radial and axial backlash, where adequate means are included to ensure the continuity of the path and its proper sealing to prevent air leaks. Therefore, in this embodiment and owing to its floating nature, when the engine is running, there is no stress transiting through the compressor case that could cause deformations.

Said at least one stress transmission rod can feature a variable or adjustable length. The length of the rod can therefore be adjusted, in particular during assembly operations.

This invention also relates to the assembly process of a multi-flow turbojet engine as described above, and that includes:
  a turbojet engine assembly step, relating in particular to the inlet case and inter-compressor case, and
  a step whereby the length of at least one axial stress transmission rod connecting the inlet case to the inter-compressor case is adjusted.

BRIEF DESCRIPTION OF THE FIGURES

The invention is better understood, and other purposes, details, characteristics and advantages of this invention will become clearer upon reading the following detailed explanatory description relating to the embodiments of the invention, provided as examples and not limited thereto, and with reference to the appended schematic drawings.

In these drawings.

DETAILED DESCRIPTION OF THE EMBODIMENTS OF THE INVENTION

Figure 1:
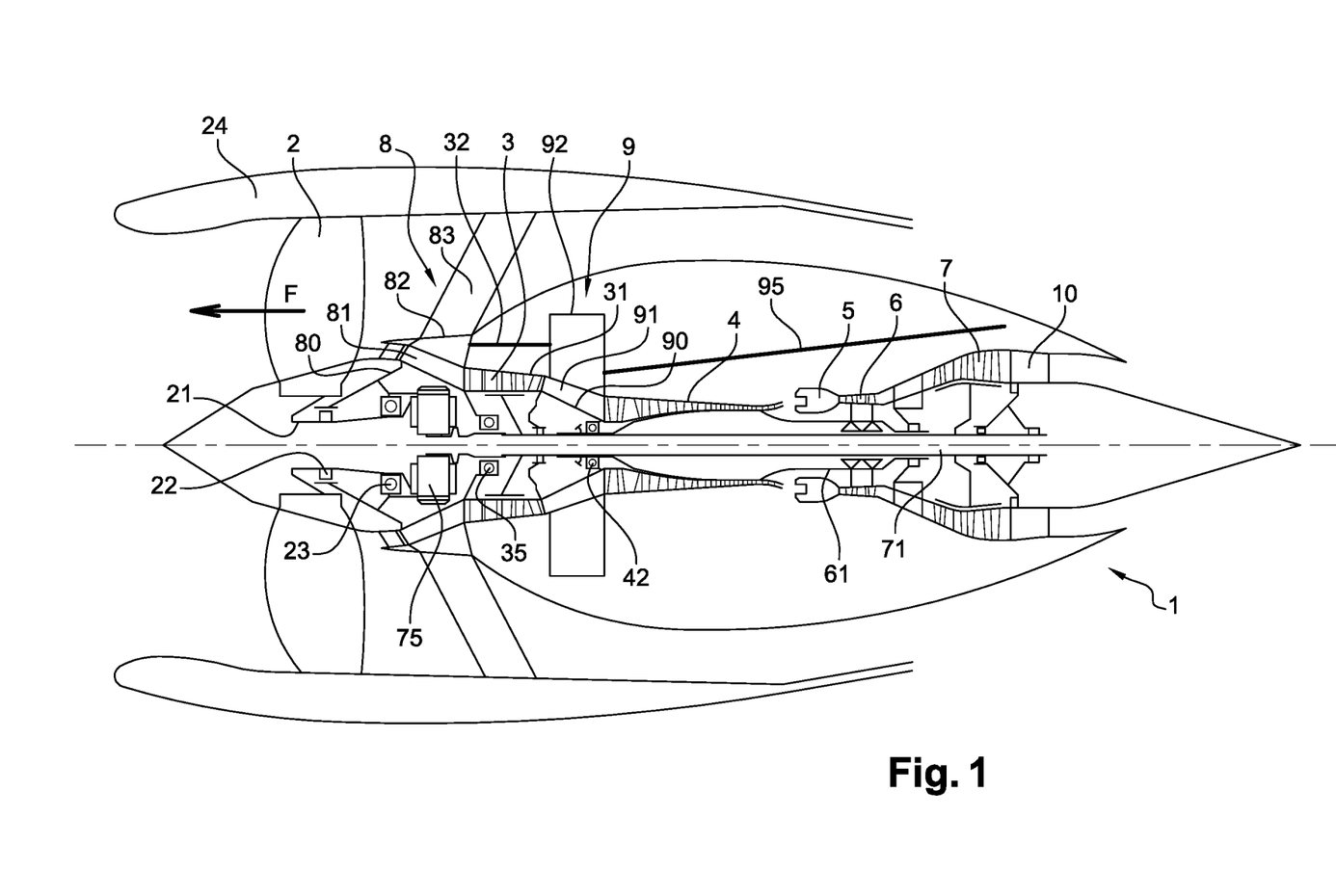
FIG. 1 shows a schematic and axial cross-section view of an example of engine architecture according to the invention.

FIG. 1 shows a turbojet engine 1 with, from upstream to downstream, a ducted fan 2 and a double-body gas generator formed by a first compressor 3, a second compressor 4, a combustion chamber 5 and two successive turbines 6 and 7. The first compressor forms the low pressure LP body with the turbine 7, to which it is connected by a turbine shaft 71. The second compressor 4 forms the high pressure HP body with the turbine 6, to which it is connected by a turbine shaft 61. The fixed structural members include the inlet case 8 located at the inlet of the gas generator between the ducted fan 2 and the LP compressor 3 and the inter-compressor case 9 between the LP compressor 3 and the HP compressor 4. Downstream, the transmission of stresses from the engine to the suspension is achieved by the exhaust case 10.

The shaft 21 of the ducted fan is mounted rotationally in two bearings 22 and 23, of which the first is for example a roller bearing, and the second 23, located in the vicinity of the case, is a ball bearing for example, and forms an axial thrust bearing. The shaft 21 is connected to the shaft 71 of the LP turbine 7 by means of a reduction gear 75 with epicyclic gearing. This shaft 71 is secured to the rotor of the LP compressor 3, which is rotationally mounted in the inlet case 8 by means of a ball bearing 35 for example, and configured to take up the axial stresses. The three bearings 22, 23 and 35 and the reduction gear 75 are mounted in, and supported by the hub 80 of the inlet case 8. Therefore, the inlet case also takes up the axial stresses of the ducted fan shaft, through the ball bearing 23 of the ducted fan shaft, as well as the axial stresses of the LP shaft, through the ball bearing 35 of the LP shaft From the hub 80 of the inlet case 8, extends a plurality of radial arms 81 that intersect with the primary flow path and are interconnected by an annular part 82 inserted between the primary flow path and the secondary flow path. From this inserted annular part 82 extends a plurality of radial arms 83 that intersect with the secondary flow path and connect the inserted part 82 to the case 24 of the ducted fan. Attachment means to the structure of the aircraft can be included in the extension of the arms 83 on the case of the ducted fan.

Figure 2:
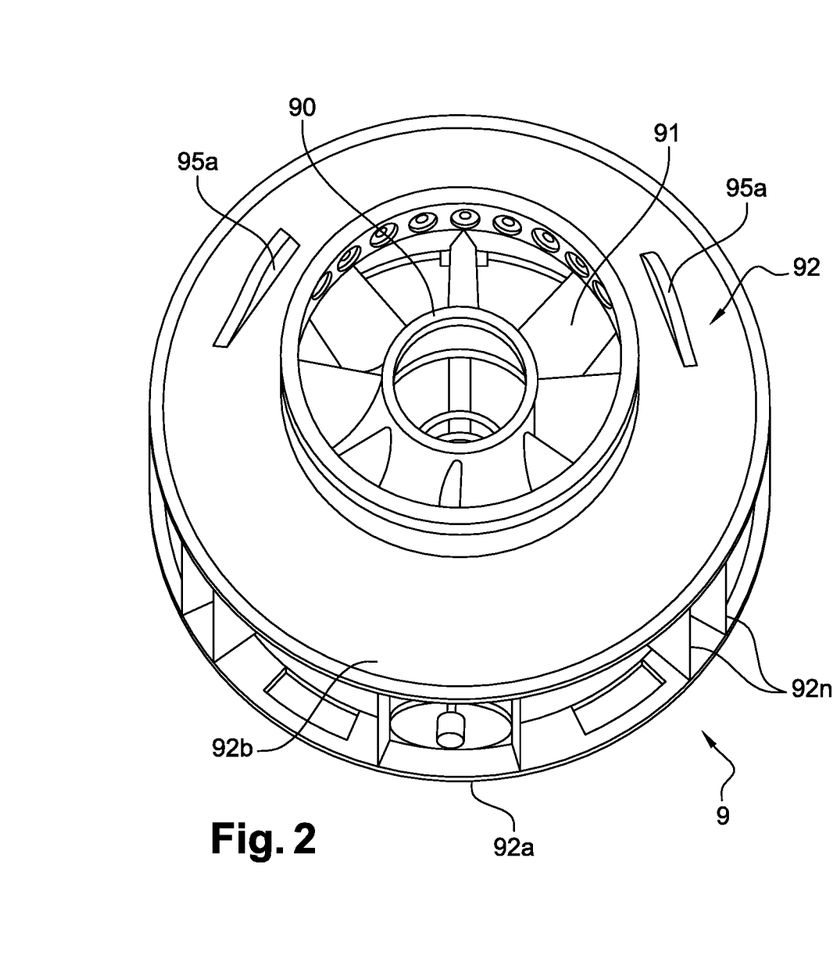
FIGS. 2 and 3 show a perspective view of an inter-compressor case, seen from downstream and the side.
Figure 3:
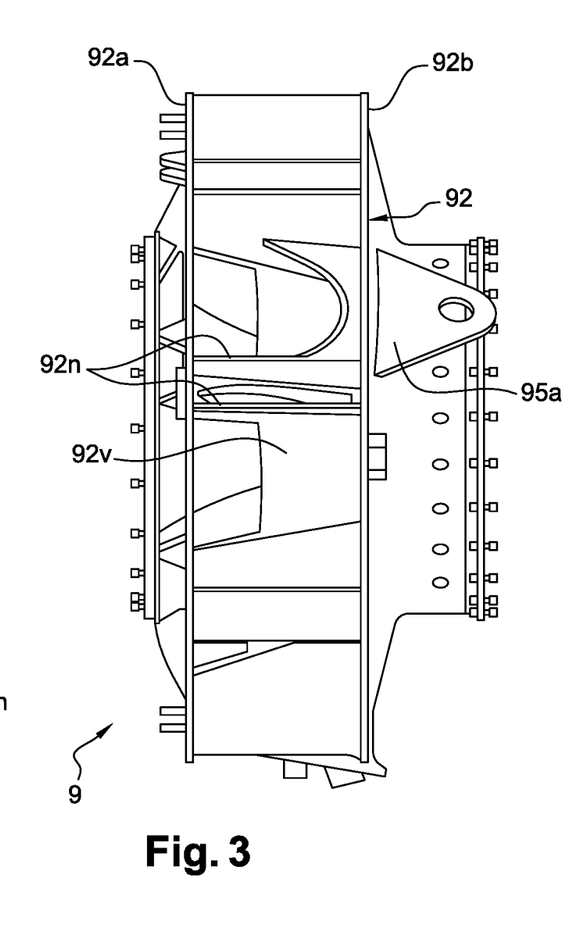

The inter-compressor case 9 is located immediately downstream from the LP compressor 3, and upstream from the HP compressor 4. It includes a hub 90, which is intersected by the LP shaft 71. This hub forms a support for the bearing 42, against which the end trunnion of the HP compressor 4 is bearing. From the hub 90 extends a plurality of radial arms 91 that intersect with the primary flow path. The arms 91 are interconnected by an annular part 92. This annular part 92 of the inter-compressor case is the seat of the attachments 95a for the thrust take-up rods 95, arranged to transmit the axial thrust stress to the suspension of the engine. An example of inter-compressor case is described in the patent application FR 3 007 458 filed by this applicant. The case is shown in FIGS. 2 and 3. It should be noted that the annular part 92 of the case 9 is primarily formed by a shroud 92v that defines the radially outer wall of the primary flow path at that level, and from which extend two transversal radial flanges with respect to the engine axis, one upstream 92a and the other downstream 92b. Axial ribs 92n arranged about the axis connect the two walls 92a and 92b. Preferentially, the ribs are arranged in the extension of the radial arms 91.

The axial stress, shown by arrow F, on the blades of the ducted fan resulting from the rotation of the ducted fan are transmitted to the shaft 21 of the ducted fan, and then from the shaft to the hub 80 through the ball bearing 23 that forms an axial thrust bearing. The stress path travels through the inlet case 8, by means of the inserted part 82, and through the case 31 of the LP compressor 3, the annular part 92 of the inter-compressor case 9 and the thrust take-up rods 95 that are secured thereto.

According to the invention, rods 32 connect the inserted part 82 and the annular part 92 of both cases 8 and 9. The rods 32 are preferentially secured at their ends by ball connections so as to only transmit tensile and compression stresses.

Figure 4:
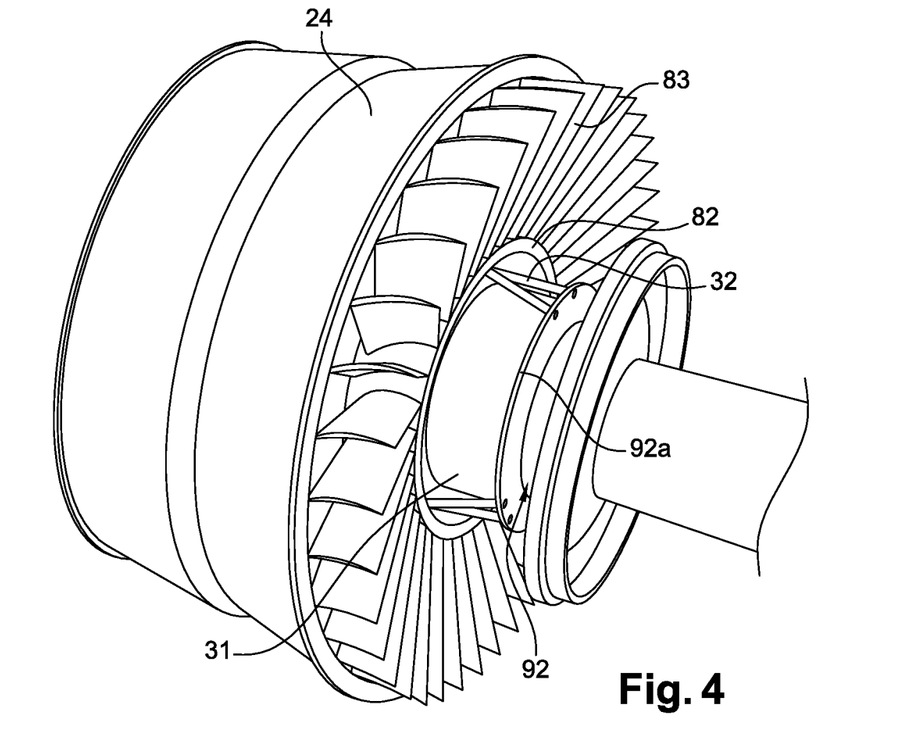
FIG. 4 shows a perspective and partially exploded view of an engine at the level of the inlet and inter-compressor cases, featuring the rods according to the invention.

Preferentially, the rods are arranged as pairs around the circumference of the case. The rods 32 of the pairs are not parallel to one another and preferentially feature a V-shape. The tip of the V is connected to the inlet case, for example to the inserted part 82 of the inlet case 8, and both ends of the V are connected to the annular part 92 of the inter-compressor case 9, namely to the upstream wall 92a, as shown in the embodiment of FIG. 4. Inversely, in another embodiment, the tip of the V can occupy a downstream position, with both ends of the V secured to the inlet case. The aperture angle of the V-shaped rods is advantageously of 20° or more, and preferentially of 30° or more.

Preferentially, the transmission of the stresses is achieved by at least three pairs, distributed evenly around the circumference if possible. In a preferred embodiment, two pairs are located in the vicinity of the attachments of the thrust take-up rods, at 10 o'clock and at 2 o'clock, as shown in FIG. 2, and the third pair is at 6 o'clock.

The assembly is therefore statically indeterminate, owing to fact that the stress paths are doubled. Stresses are distributed based on the rigidity ratio of these two paths. Therefore, if the rods are rigid and the compressor case is flexible, most of the stresses will travel through the rods. The compressor undergoes less stress, and deformations are limited.

In one embodiment (not shown), the compressor case is configured to be floating. For example, the case is configured to be floating by connecting it to one of the two inlet and inter-compressor cases with a backlash connection, preferentially with a radial and axial backlash, where adequate means are included to ensure the continuity of the path and its proper sealing to prevent air leaks. Therefore, when the engine is running, there is no stress transiting through the compressor case that could cause deformations.

Figures 5, 6:
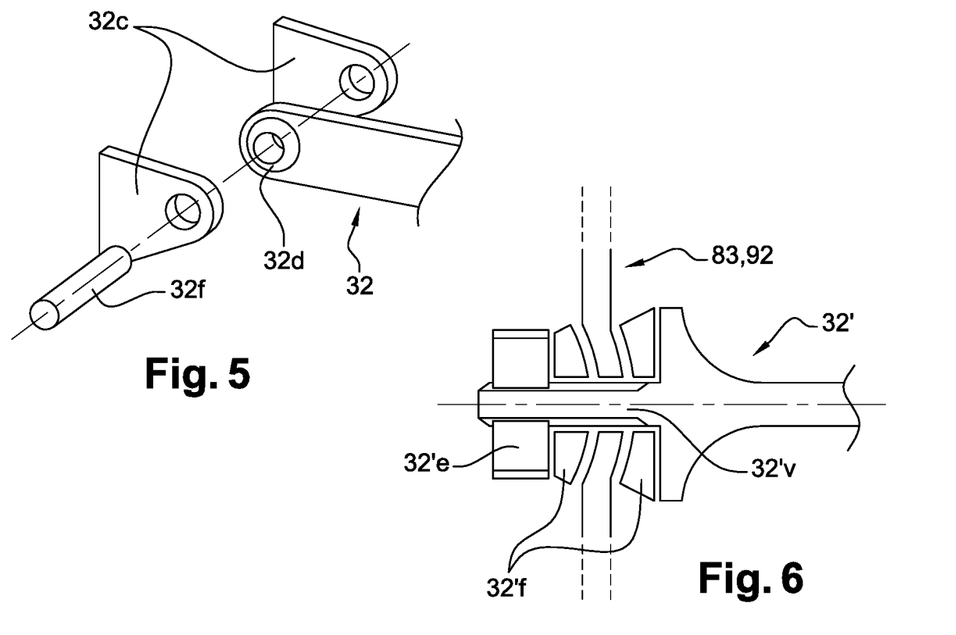
FIGS. 5 and 6 show two attachments whereby the rods are secured to the wall by means of a ball connection.

An attachment method of the rods, relying on a ball connection, is shown in FIG. 5. A socket 32d is mounted in a housing at the end of the rod 32. The socket is rotationally mobile about its centre owing to its spherical outer surface that works with the surface, which is also spherical, of its housing in the rod. The socket is intersected by an axis 32f, the ends of which are housed in covers that are secured, respectively, to the parts 82, 92. This connection provides for the transmission of stresses towards the rod.

FIG. 6 shows another embodiment of the ball connection. In this configuration, the rod 32' is extended at its end by a screw 32v housed in the wall of the part 82, 92, to which it is secured. The wall features a spherical surface that cooperates with the wearing parts 32'f inserted between the tightening nut 32'e of the screw 32v and the shoulder at the end of the tie rod. This spherical contact surface allows limited angular motions, while remaining rigid along the axis of the rod 32'.

According to the embodiment of the annular part 92 shown above, with axial ribs 92n connecting the two walls 62a and 62b of the annular part 92, the rods can be secured in different manners, as described above.

Figure 7:
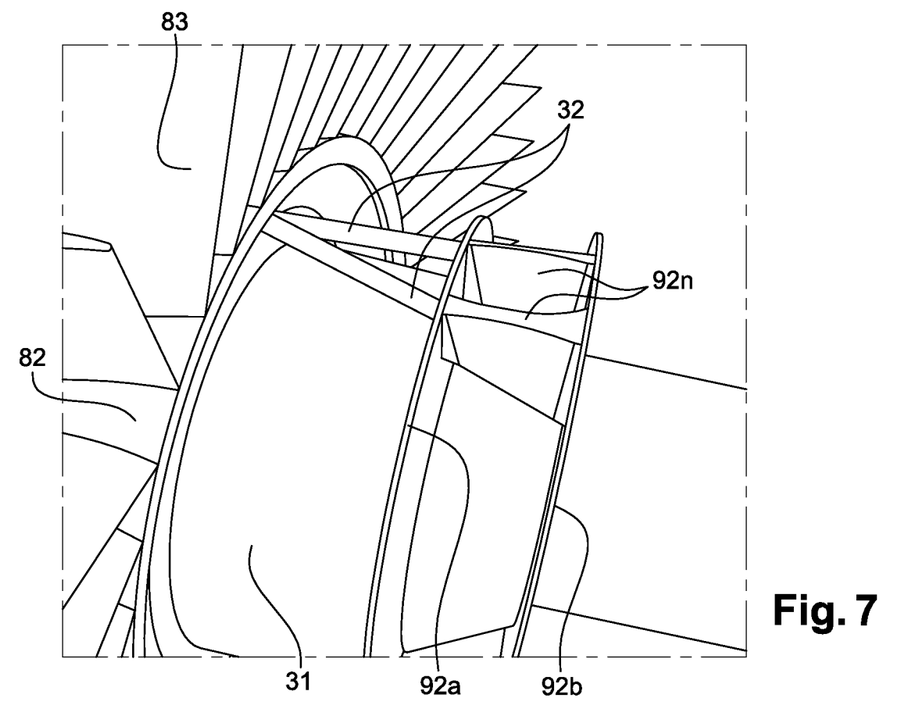
FIG. 7 shows a perspective view of an arrangement of rod pairs bearing against the inside of the inter-compressor case.

According to one embodiment of the invention, the rods are secured to the annular part of the inter-compressor case in the extension of the ribs 92n, as seen in FIG. 7. The transmission of stresses between the rods and the part 92 can therefore occur without causing deformations to the annular part. To further improve the distribution of stresses on the walls, the ribs are connected to the walls 92a and 92b by fillets configured to be as wide as possible. Furthermore, depending on the arrangement of the ribs, the V can be inverted so as to position the double attachment on the inlet case side, so that there is only one rib in the inter-compressor case, in the extension of the rod attachments. Therefore, depending on the orientation of the V, two ribs are positioned in the alignment of the attachments and correspond to the ends of the V or one rib is positioned to correspond to the tip of the V.

Figure 8:
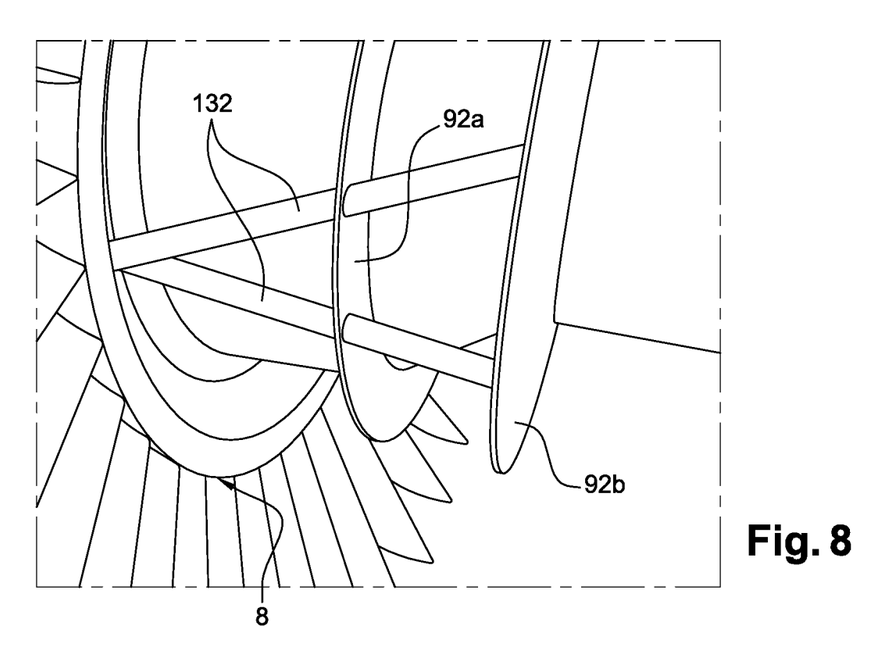
FIG. 8 shows another embodiment of the connection of the rods to the inter-compressor case.

According to one embodiment version, the rod 132 of each pair is mounted to intersect with the upstream wall 92*a* and to be secured directly to the downstream wall 92*b*, as shown in FIG. 8.

Figure 9:
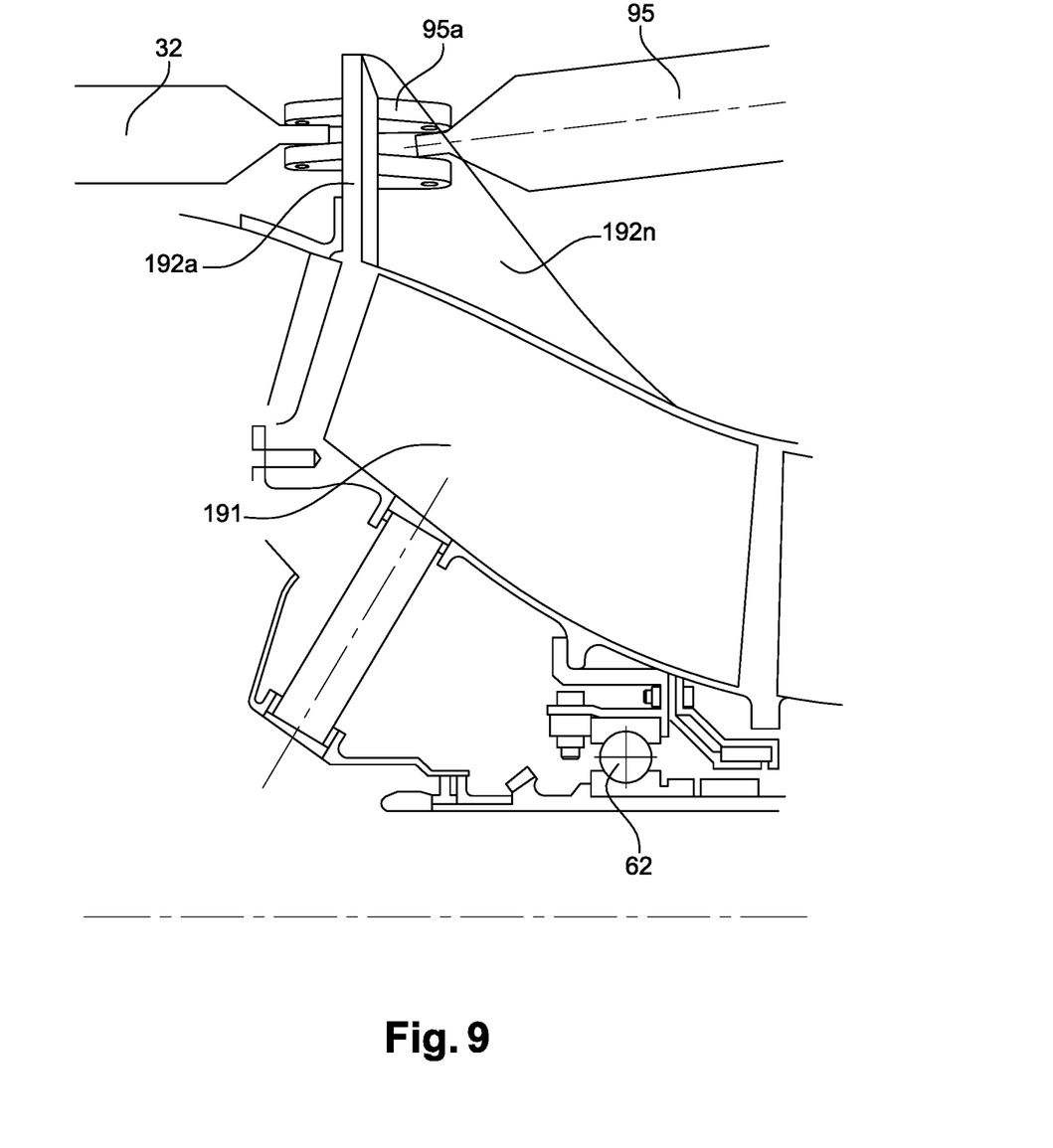
FIG. 9 shows another embodiment version of the inter-compressor case with a single radial wall.

According to another version, the invention can also apply to an annular part 192 of the inter-compressor case, connecting the radial arms 191 that intersect with the primary flow path, and featuring a single radial wall 192*a*, as shown in FIG. 9. The wall 192*a* is therefore preferentially reinforced with an adapted rib 192*n*. The thrust take-up rod and the rod 32 are mounted on either side of said radial wall 192*a*.

The invention relates to other embodiments (not shown) that serve the same purpose.

Figure 10:
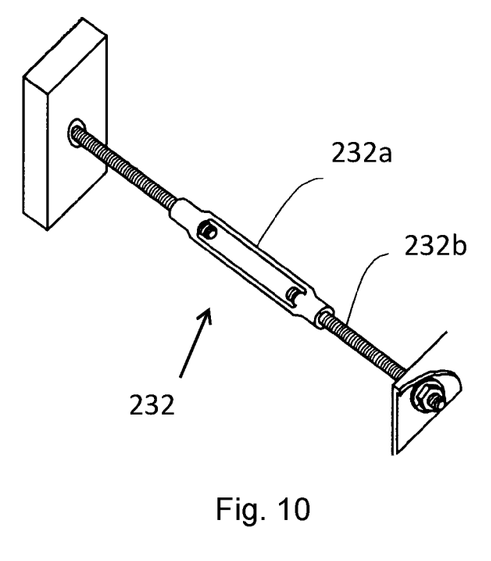
FIG. 10 shows a rod with a variable length.

FIG. 10 shows a stress transmission rod 232 with a variable length. In the example shown, the rod 232 includes an elongated central body 232*a*, the longitudinal ends of which are screwed on threaded rods 232*b* secured respectively to the inlet case 8 and the inter-compressor case 9. In another version, they can be secured to the cases according to the attachment methods described in FIGS. 5 and 6.

The length of the rod can therefore be adjusted, in particular during assembly operations. During the assembly of a multi-flow turbojet engine as described above, the first step relates to the assembly of the turbojet engine, and in particular of the inlet case and of the inter-compressor case; this step is followed by the adjustment of the length(s) of the stress transmission rod(s) connecting the inlet case to the inter-compressor case. More specifically, the compressors 3, 4 can be connected to both cases 8, 9 and the rods 232 can be mounted on the cases. Their lengths are then adjusted more finely so that they correspond with the exact dimensions of the compressors.

The invention claimed is:

1. A multi-flow turbojet engine, comprising:
    an upstream ducted fan driven by a gas generator, whereby the gas generator comprises a first compressor and a second compressor that is coaxial with the first compressor;
    an inlet case configured to form a support for a fan rotor of the upstream ducted fan and a first compressor rotor of the first compressor;
    an inter-compressor case located downstream from the inlet case, and configured to form a support for a second compressor rotor of the second compressor;
    attachment means for a plurality of thrust take-up rods arranged on the inter-compressor case; and
    at least one axial stress transmission rod that connects the inlet case to the inter-compressor case.

2. The turbojet engine according to claim 1, wherein the at least one axial stress transmission rod comprises at least one non-parallel pair of axial stress transmission rods.

3. The turbojet engine according to claim 2, wherein the at least one axial stress transmission rod comprises at least three pairs of axial stress transmission rods distributed about an axis of the turbojet engine.

4. The turbojet engine according to claim 3, wherein the at least one axial stress transmission rod connects to at least one of the inlet case and the inter-compressor case via a ball connection.

5. The turbojet engine according to claim 4, wherein at least one of the inlet case and the inter-compressor case comprises a plurality of radial walls arranged perpendicularly to the axis of the turbojet engine, whereby at least two radial walls of the plurality of radial walls are interconnected by a plurality of ribs oriented substantially parallel to the axis.

6. The turbojet engine according to claim 5, wherein at least one axial stress transmission rod connects to at least one of the inlet case and the inter-compressor case in an extension of at least one of the plurality of ribs.

7. The turbojet engine according to claim 1, wherein the at least one axial stress transmission rod comprises at least one pair of axial stress transmission rods, wherein the inter-compressor case comprises an upstream wall and a downstream wall, and wherein each rod of the at least one pair of axial stress transmission rods is attached to the downstream wall.

8. The turbojet engine according to claim 1, wherein the upstream ducted fan is driven by a low pressure turbine that comprises a reduction gear between a shaft of the low pressure turbine and the upstream ducted fan.

9. The turbojet engine according to claim 8, wherein at least a part of a plurality of bearings supporting the shaft of the upstream ducted fan and the shaft of the low pressure turbine, in the inlet case, is configured to form an axial bearing.

10. The turbojet engine according to claim 1, wherein a case of the first is configured to be floating, and secured to the inlet case or the inter-compressor case by a backlash connection.

11. The turbojet engine according to claim 1, wherein the at least one axial stress transmission rod features a variable length.

12. A multi-flow turbojet engine, comprising:
    an upstream ducted fan driven by a gas generator, whereby the gas generator comprises a first compressor and a second compressor that is coaxial with the first compressor;
    an inlet case configured to form a support for a fan rotor of the upstream ducted fan and a first compressor rotor of the first compressor;
    an inter-compressor case located downstream from the inlet case, and configured to form a support for a second compressor rotor of the second compressor;
    a plurality of thrust take-up rods arranged on the inter-compressor case; and
    at least one axial stress transmission rod that connects the inlet case to the inter-compressor case.

\* \* \* \* \*